US010935681B2

(12) United States Patent
Roure

(10) Patent No.: US 10,935,681 B2
(45) Date of Patent: Mar. 2, 2021

(54) METHODS AND SYSTEMS PERFORMING JOINT VVAZ AND AVAZ INVERSION

(71) Applicant: CGG SERVICES SAS, Massy (FR)

(72) Inventor: Benjamin Roure, Moigny-sur-Ecole (FR)

(73) Assignee: CGG SERVICES SAS, Massy (FR)

( * ) Notice: Subject to any disclaimer, the term of this patent is extended or adjusted under 35 U.S.C. 154(b) by 397 days.

(21) Appl. No.: 15/994,273

(22) Filed: May 31, 2018

(65) Prior Publication Data
US 2019/0369279 A1 Dec. 5, 2019

(51) Int. Cl.
*G01V 1/30* (2006.01)
*G01V 1/36* (2006.01)

(52) U.S. Cl.
CPC .............. *G01V 1/30* (2013.01); *G01V 1/303* (2013.01); *G01V 1/307* (2013.01); *G01V 1/362* (2013.01); *G01V 2210/626* (2013.01); *G01V 2210/632* (2013.01)

(58) Field of Classification Search
CPC .... G01V 1/30; G01V 1/303; G01V 2210/626; G01V 2210/632; G01V 1/307; G01V 1/362
See application file for complete search history.

(56) References Cited

U.S. PATENT DOCUMENTS

| 6,681,184 B2 | 1/2004 | Jenner et al. |
| 8,792,303 B2 | 7/2014 | Downton et al. |
| 2017/0102471 A1 | 4/2017 | Roure |
| 2017/0322331 A1 | 11/2017 | Roure |

FOREIGN PATENT DOCUMENTS

| WO | 2015092542 A2 | 6/2015 |
| WO | 2016027156 A1 | 2/2016 |

OTHER PUBLICATIONS

Al Dulaijan, Khaled "Inversion of azimuthal velocity and amplitude variations for seismic anisotropy", A Thesis submitted to the faculty of graduate studies in partial fulfillment of the requirements for the degree of Doctor of Philosophy, Calgary, Alberta (Year: 2017).*
Mallick, S., D. Mukherjee, L. Shafer, and E. CampbellStone, 2017, Azimuthal anisotropy analysis of P-wave seismic data and estimation of the orientation of the in situ stress fields—An example from the RockSprings uplift, Wyoming, USA: Geophysics, 82, No. 2, B63-B77, doi: 10.1190/geo2015-0268.1. (Year: 2017).*
Andreas Ruger, "Variation of P-wave reflectivity with offset and azimuth in anisotropic media," Geophysics, May-Jun. 1998, vol. 63, No. 3, pp. 935-947.

(Continued)

*Primary Examiner* — Ian J Lobo
(74) *Attorney, Agent, or Firm* — Patent Portfolio Builders PLLC

(57) ABSTRACT

Methods for seismic exploration of an underground formation including at least one anisotropic layer perform a joint velocity-variation-with-azimuth, VVAz, and amplitude-variation-with-azimuth, AVAz, inversion using the azimuthal angle stacks to obtain a structural representation of the underground formation. The structural representation is used to generate scenarios for exploiting resources in at least one layer of the underground formation.

20 Claims, 11 Drawing Sheets

(56) References Cited

OTHER PUBLICATIONS

Benjamin Roure, "Statistical moments for azimuthal anisotropy characterization," SEG Denver 2014 Annual Meeting, Oct. 26-31, 2014, Denver, Colorado, pp. 290-294.
Bill Goodway et al., "Combined microseismic and 4D calibrate and confirm surface 3D azimuthal AVO/LMR predictions of completions performance and well production in the Horn River gas shales of NEBC," The Leading Edge, Dec. 2012, pp. 1502-1511.
Colin M. Sayers, "The sensitivity of seismic waves to the normal and shear compliance of fractures," SEG Houston 2009 International Exposition and Annual Meeting, Oct. 25-30, 2009, Houston, Texas, pp. 3441-3445.
Ilya Tsvankin et al., "Developments in seismic anisotropy: Treating realistic subsurface models in imaging and fracture detection," CSEG Recorder 2006 Special Edition, 2006, pp. 43-46.
Ilya Tsvankin, "Reflection moveout and parameter estimation for horizontal transverse isotropy," Geophysics, Mar.-Apr. 1997, vol. 62, No. 2, pp. 614-629.
Jon Downton et al., "Azimuthal simultaneous elastic inversion for fracture detection," SEG Denver 2010 Annual Meeting, Oct. 17-22, 2010, Denver, Colorado, pp. 263-267.
Leon Thomsen, "Weak elastic anisotropy," Geophysics, Oct. 1986, vol. 51, No. 10, pp. 1954-1966.
Extended European Search Report dated Nov. 4, 2019, in corresponding/related European Application No. EP 19 30 5685.
Mallick, et al.; "Case History—Azimuthal anisotropy analysis of P-wave seismic data and estimation of the orientation of the in situ stress fields: An example from the Rock-Springs uplift, Wyoming, USA"; Geophysics, vol. 82, No. 2; Mar.-Apr. 2017; pp. B63-B77.
Qi, et al.; "Correcting for VVAz prior to AVAz analysis"; 2015 SEG New Orleans Annual Meeting, SEG Technical Program Expanded Abstracts; Aug. 19, 2015; pp. 321-325.

\* cited by examiner

METHODS AND SYSTEMS PERFORMING JOINT VVAZ AND AVAZ INVERSION

TECHNICAL FIELD

Embodiments of the subject matter disclosed herein generally relate to methods and systems for subsurface exploration, and, in particular, to methods and systems that perform a joint velocity-variation-with-azimuth, VVAz, and amplitude-variation-with-azimuth, AVAz, inversion.

DISCUSSION OF THE BACKGROUND

Probing underground formations in search of hydrocarbon and other resources is an ongoing process driven by continually increasing worldwide demand. Seismic surveys are used for exploration, hydrocarbon reservoir field development, and production monitoring (time lapse). In a simplistic view, seismic excitations emerging from an explored underground (or under seafloor) formation are detected by receivers that generate seismic data (e.g., sampled amplitude of a detected seismic excitation, sampling time and position of the receiver). Generated seismic excitations are usually a combination of compression or P-waves (in which the oscillation is parallel with the propagation direction). If the P-waves are detected after travelling through the explored formation, then seismic data is known as PP seismic data. However, the initial P-waves may be partially converted into S-waves inside the explored formation (in which the oscillation is perpendicular to the propagation direction). If the S-waves are detected after traveling through the explored formation, then seismic data is known as PS seismic data.

The seismic data undergoes a complex multi-phase processing to yield a structural image based on different properties inside the underground formation. In the seismic data, the sought-after structural information is on one hand mixed with noise, and, on the other hand, the result of various phenomena that occur during the seismic excitations' propagation through various layers.

One physical characteristic of a layer may be anisotropy, which is propagation with different velocities in different directions, and may be due to fractures or stress. The main technologies used to characterize azimuthal anisotropy, whether it is fracture- or stress-induced, from PP seismic data are Velocity-Variation-with-Azimuth (VVAz) and Amplitude-Variation-with-Azimuth (AVAz).

For VVAz, the seismic data has to be prepared prior to the analysis. FIG. 1 shows a real data example of a Common Offset Common Azimuth (COCA) cube of data with adjacent slices having increasing offset (or incidence angle) from left to right, and for each offset slice, the azimuth is also increasing from left to right. The azimuthal variation in travel-times appears as a sinusoidal distortion more visible at larger offsets. VVAz is an azimuthal NMO (normal moveout) correction that flattens the data by removing the azimuthal variation of travel-times.

VVAz usually picks visible seismic events resulting in thick intervals of a few hundred milliseconds. Therefore, VVAz is considered a low-resolution method as discussed, for example, in the article entitled, "The sensitivity of seismic waves to the normal and shear compliance of fractures," by Sayers, C. published in SEG Houston 2009 International Exposition and Annual Meeting, pp. 3441-3445, and the article entitled, "Developments in seismic anisotropy: Treating realistic subsurface models in imaging and fracture detection," by Tsvankin, I. and Grechka, V. published in CSEG Recorder 2006 Special Edition, both articles being incorporated herein by reference in their entirety. This flattening step produces anisotropy estimates (anisotropy magnitude and orientation) that can be used for anisotropy characterization.

Once the data is "flattened," the amplitudes can be analyzed at each time sample, as exemplarily illustrated in FIG. 2. Since AVAz can be studied at the seismic sample resolution (a few milliseconds), it is assumed to have higher resolution than VVAz. AVAz can be solved in different ways, for example:
- near or far offset Rüger equation (as described in the article entitled, "Variation of P-wave reflectivity with offset and azimuth in anisotropic media," by Rüger, A. published in *Geophysics*, Vol. 63, No. 3 (May-June 1998), pp. 935-947,
- azimuthal Fourier Coefficients (as described in the article entitled, "Azimuthal simultaneous elastic inversion for fracture detection," by Downton, J. and Roure, B. published in SEG Denver 2010 Annual Meeting, pp. 263-267), or
- azimuthal statistical moments (as described in the article entitled, "Statistical moments for azimuthal anisotropy characterization," by Roure, B. published in SEG Denver 2014 Annual Meeting, pp. 290-294).

An example of AVAz inversion and its interpretation for a shale gas play in Canada is described in the article, "Combined microseismic and 4D calibrate and confirm surface 3D azimuthal AVO/LMR predictions of completions performance and well production in the Horn River gas shales of NEBC," by Goodway et al. published in *The Leading Edge*, December 2012, pp. 1502-1511. All the articles mentioned in this paragraph are incorporated by reference in their entirety.

AVAz has a higher resolution than VVAz, but it is more unstable and it is limited by its non-uniqueness. AVAz has the drawbacks of an inherent 90° ambiguity and of being highly non-linear. AVAz is very demanding on data quality, requiring large incidence angles, as many azimuths as possible and very little noise. AVAz is sensitive to more anisotropy parameters so there is more information to extract from AVAz, but to do so is more complex.

FIG. 3 is a flowchart of a conventional method sequentially performing VVAz and AVAz. Starting from the seismic data 300, first, WAZ performed at 310 yields flattened azimuthal angle stacks 312 and anisotropy orientation and magnitude from velocities 314. The flattened azimuthal angle stacks 312 are then used to perform AVAz at 320, yielding anisotropy orientation and magnitude from amplitudes 324. As suggested by the arrows in FIG. 3, the anisotropy orientation and magnitude from velocities 314 may be used as an initial model for AVAz. The anisotropy orientation and magnitude obtained from VVAz and AVAz may be difficult to reconcile because they are not consistent in magnitude and orientation. This difference is usually attributed to the different resolutions, but also to the assumption that VVAz is more sensitive to stress and AVAz is more sensitive to fractures.

Thus, there is a need to propose methods and systems that overcome the above-described drawbacks and limitations of conventional VVAz and AVAz methods.

SUMMARY

Methods and devices according to various embodiments perform joint VVAz and AVAz inversion achieving higher resolution than VVAz only, removal of the 90° ambiguity of AVAz only, and reduction of the non-uniqueness of AVAz only (absent additional constraints) by using coupling that VVAz introduces between the inverted properties. The joint VVAz and AVAz inversion uses unflattened data to preserve both the amplitudes and travel-times information, thereby avoiding the stretch and squeeze flattening process, and is less demanding on data quality (i.e., requires fewer azimuth and incidence angles, and reduces AVAz's sensitivity to azimuthal noise).

According to an embodiment, there is a method for seismic exploration of an underground formation including at least one anisotropic layer. The method includes receiving seismic data acquired by detecting seismic excitations traveling through the underground formation, grouping the seismic data in azimuthal angle stacks, performing a joint VVAz and AVAz inversion using the azimuthal angle stacks to obtain a structural representation of the underground formation, and generating scenarios for exploiting resources in at least one layer of the underground formation based on the structural representation.

According to another embodiment, there is a system for seismic exploration of an underground formation including at least one anisotropic layer. The system includes seismic data acquisition equipment configured to inject seismic excitations into the underground formation, to detect the seismic excitations that traveled through the underground formation, and to generate the seismic data based on the detected seismic excitations. The system further includes a seismic data processing unit configured to group the seismic data in azimuthal angle stacks, to perform a joint velocity-variation-with-azimuth, VVAz, and amplitude-variation-with-azimuth, AVAz, inversion using the azimuthal angle stacks to obtain a structural representation of the underground formation, and to generate scenarios related to exploiting resources in at least one layer of the underground formation using the structural representation.

According to yet another embodiment, there is a computer-readable medium storing executable codes which, when executed by a processor, make the processor perform a method of seismic exploration of an underground formation including at least one anisotropic layer. The method includes receiving seismic data acquired by detecting seismic excitations traveling through the underground formation, grouping the seismic data in azimuthal angle stacks, performing a joint VVAz and AVAz inversion using the azimuthal angle stacks to obtain a structural representation of the underground formation, and generating scenarios for exploiting resources in at least one layer of the underground formation based on the structural representation.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of seismic survey in general, the joint VVAz and AVAz inversion being usable for both land and marine seismic data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
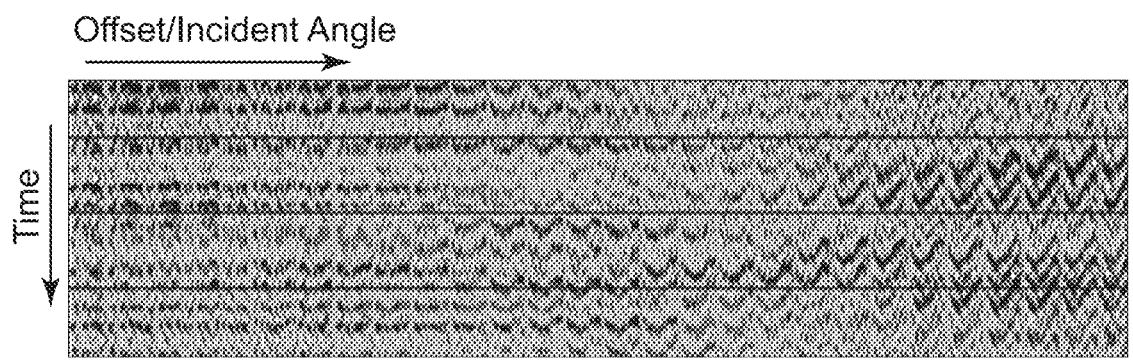
FIG. 1 illustrates seismic data of a COCA cube.
Figure 2:
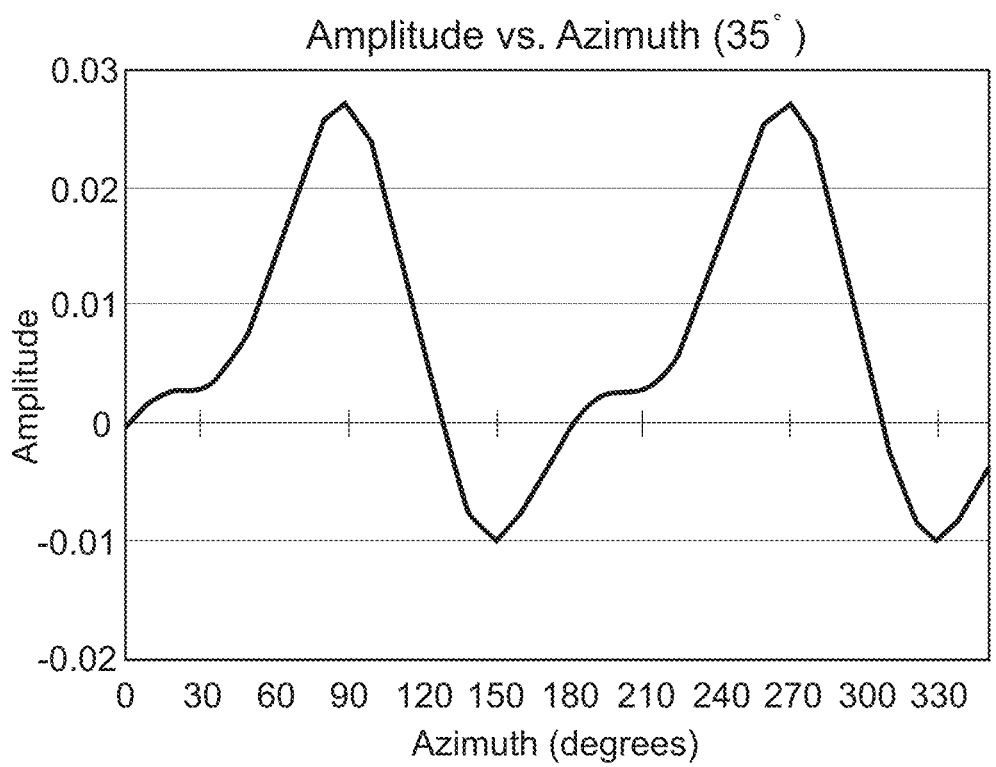
FIG. 2 is a graph illustrating amplitude variation with azimuth for a given incidence angle and time sample.
Figure 3:
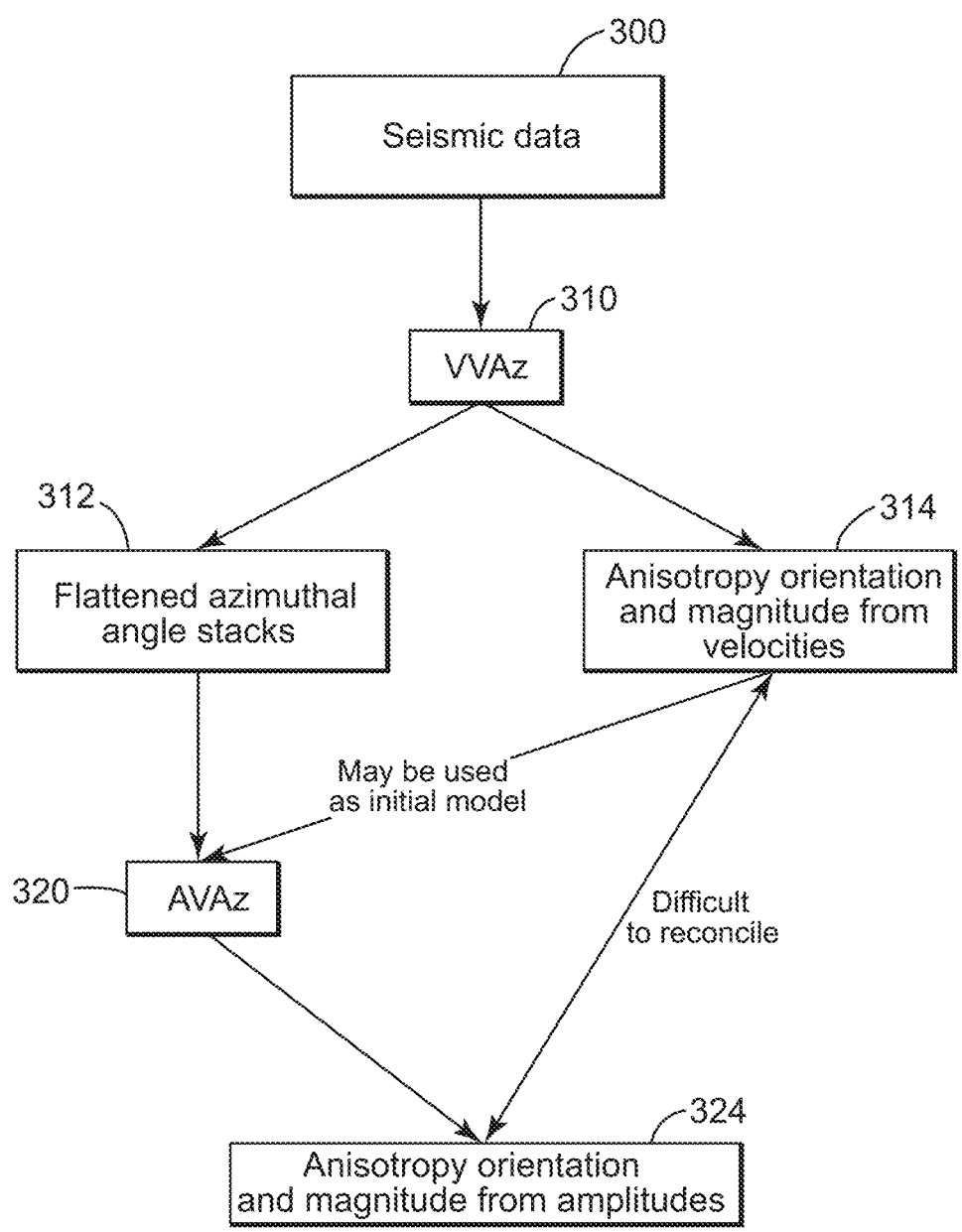
FIG. 3 is a flowchart of a conventional method sequentially performing VVAz and AVAz.
Figure 4:
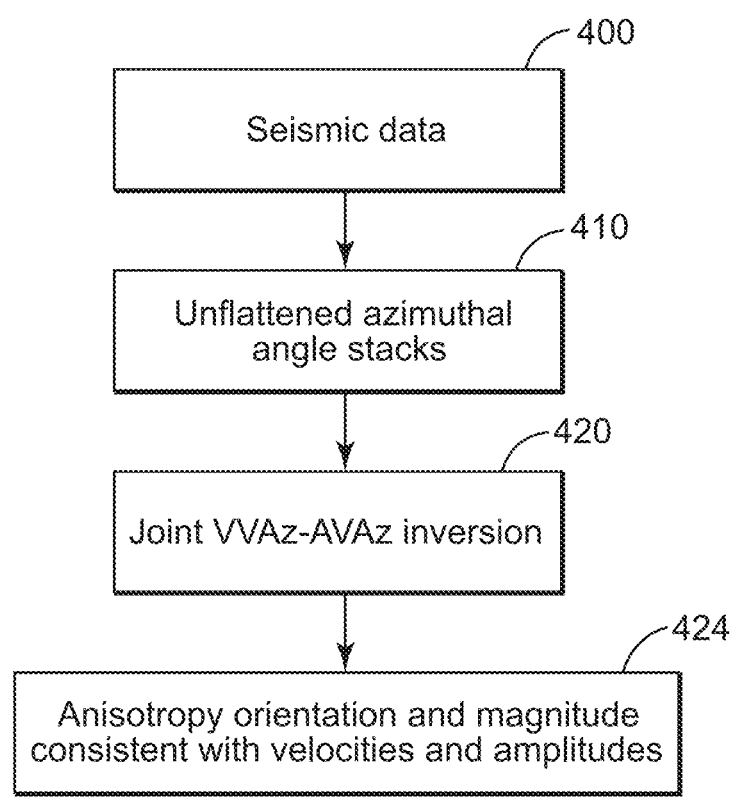
FIG. 4 is a flowchart of a method performing joint VVAz and AVAz, according to an embodiment.

FIG. 4 is a flowchart of a method performing joint VVAz and AVAz inversion, according to an embodiment. Seismic data 400 is grouped in unflattened azimuthal angle stacks at 410. As previously illustrated in FIG. 1, unflatten data has azimuthal variation of travel-times and amplitudes. Azimuthal normal-moveout correction (performed as part of the VVAz analysis) reveals that the travel-times anisotropy increases with the incidence angle. Both corrected and uncorrected traces reveal the amplitude anisotropy increases with incidence angle. The joint VVAz and AVAz inversion works with the unflatten traces and simultaneously translates/inverts the travel-times and amplitude changes in terms of anisotropy properties.

The unflattened azimuthal angle stacks are then inverted using VVAz and AVAz jointly at 420, yielding anisotropy orientation and magnitude consistent with velocities and amplitudes 424.

The joint VVAz and AVAz inversion uses a stratigraphic grid whose resolution may be as fine as a few ms, thereby greatly enhancing the resolution of the VVAz approach. In the stratigraphic grid can coexist multiple vertical axes (time or depth). The use of stratigraphic grid is explained first in the simpler 4D (i.e., surveys acquired in the same area with long time intervals there-between, the earliest survey being known as "base" and the later one(s) as monitor(s)), and PP-PS inversion contexts.

Figure 5:
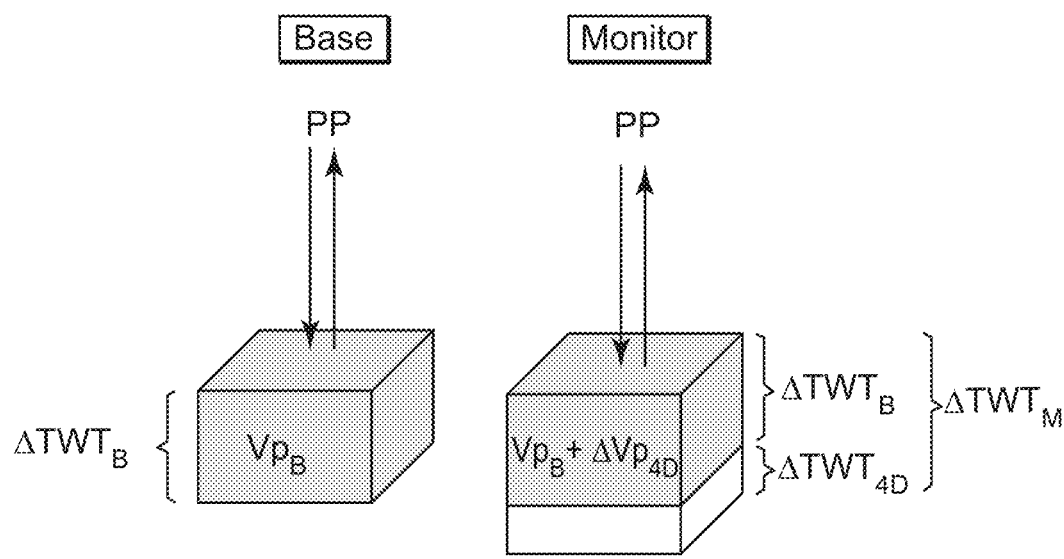
FIG. 5 illustrates 4D time-shifts in a stratigraphic approach.

In 4D, the multiple time axes allow handling production-induced time-shifts by defining a time axis per vintage without aligning the monitor(s) traces to the base traces. Neglecting compaction effects between vintages (i.e., at constant depth), 4D time-shifts ($\Delta TWT_{4D}$) can be related to 4D changes in P-velocity ($\Delta Vp_{4D}$) as illustrated in FIG. 5 and mathematically expressed in formula (1) below, where $\Delta TWT_B$ is the time-thickness of the layer for the base vintage, $\Delta TWT_M = \Delta TWT_B + \Delta TWT_{4D}$ is the time-thickness of the layer for the monitor vintage, $Vp_B$ is the P-velocity of the base and $Vp_M = Vp_B + \Delta Vp_{4D}$ is the P-velocity of the monitor vintage. The vertical arrows indicate that the PP seismic waves are traveling vertically (i.e., considering post-stack time-shifts only).

$$\Delta TWT_{4D} = \Delta TWT_B \times \left( \frac{Vp_B}{Vp_M} - 1 \right) \quad (1)$$

Figure 6:
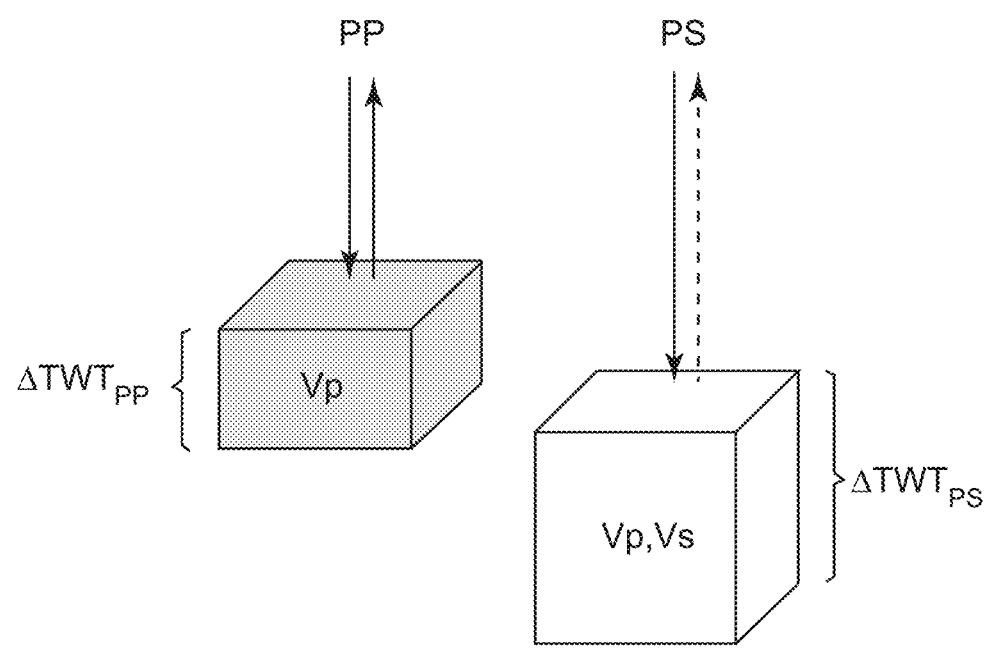
FIG. 6 illustrates the use of the stratigraphic grid for multi-component data.

In the case of multi-component (PP-PS) data, the stratigraphic grid handles the difference in travel time between PP and PS waves by defining a time axis for each wave mode without squeezing the PS seismic traces to match PP times. Since the depth is the same in the PP and PS domains, similar to formula (1), formula (2) below links the layer thickness in PS times ($\Delta TWT_{PS}$), in PP times ($\Delta TWT_{PP}$), and the P- to S-velocity ratio Vp/Vs. Here again, post-stack travel times are considered. This correspondence is illustrated in FIG. 6.

$$\Delta TWT_{PS} = \frac{1}{2} \Delta TWT_{PP} \times \left( \frac{Vp}{Vs} + 1 \right) \quad (2)$$

Figure 7:
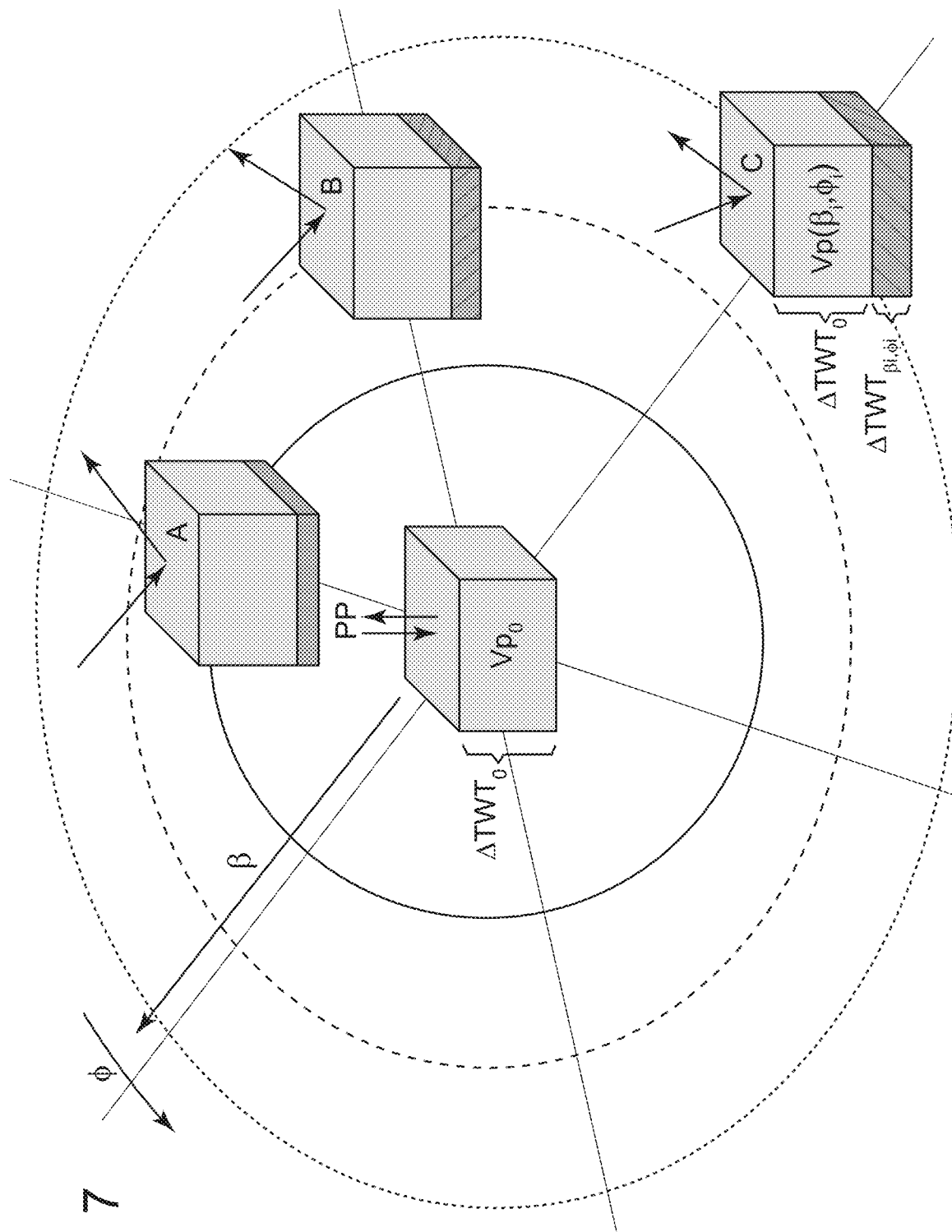
FIG. 7 illustrates the stratigraphic approach for azimuthal anisotropy analysis.
Figure 8:
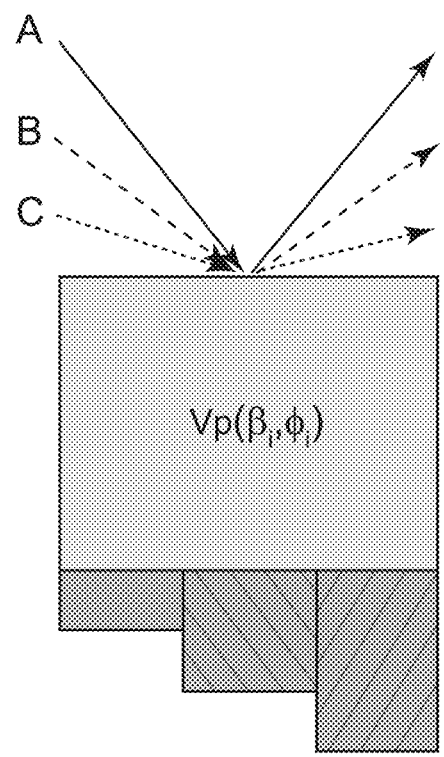
FIG. 8 illustrates variation with incidence angle only for the elements in FIG. 7.
Figure 9:
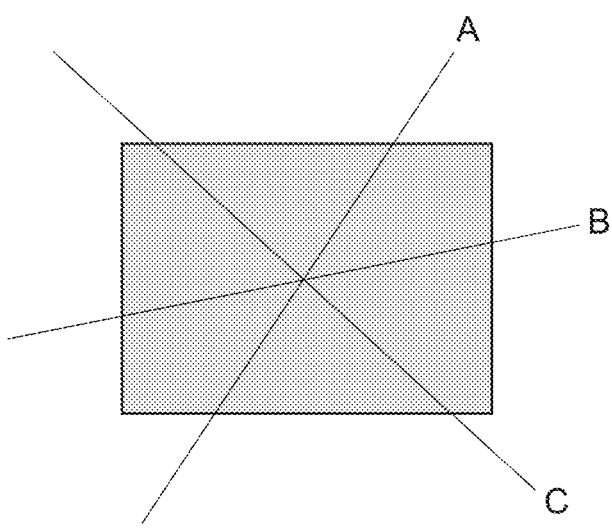
FIG. 9 illustrates azimuth angles for the elements in FIG. 7.

The same stratigraphic grid approach can be used for azimuthal anisotropy, but the travel-times considered are now pre-stack as non-vertical propagation that varies with incidence angle and azimuth as illustrated in FIG. 7. The arrows on top of the volume elements A, B and C (the middle element being reference) illustrate the different incidence angles and azimuth angles. The variation with incidence angle only for the elements in FIG. 7 is illustrated in FIG. 8, and the azimuth angles thereof are illustrated in FIG. 9.

Unlike the previous cases (i.e., 4D and PP-PS) where the medium was assumed to be isotropic, an anisotropic medium is now considered. As a result, the phase and group velocities become different. AVAz (amplitude) is related to phase velocities, whereas VVAz (travel-time) is related to group velocities. In order to invert jointly velocities/travel-times and amplitudes, the phase velocities extracted from the amplitudes are converted into group velocities.

Figure 10:
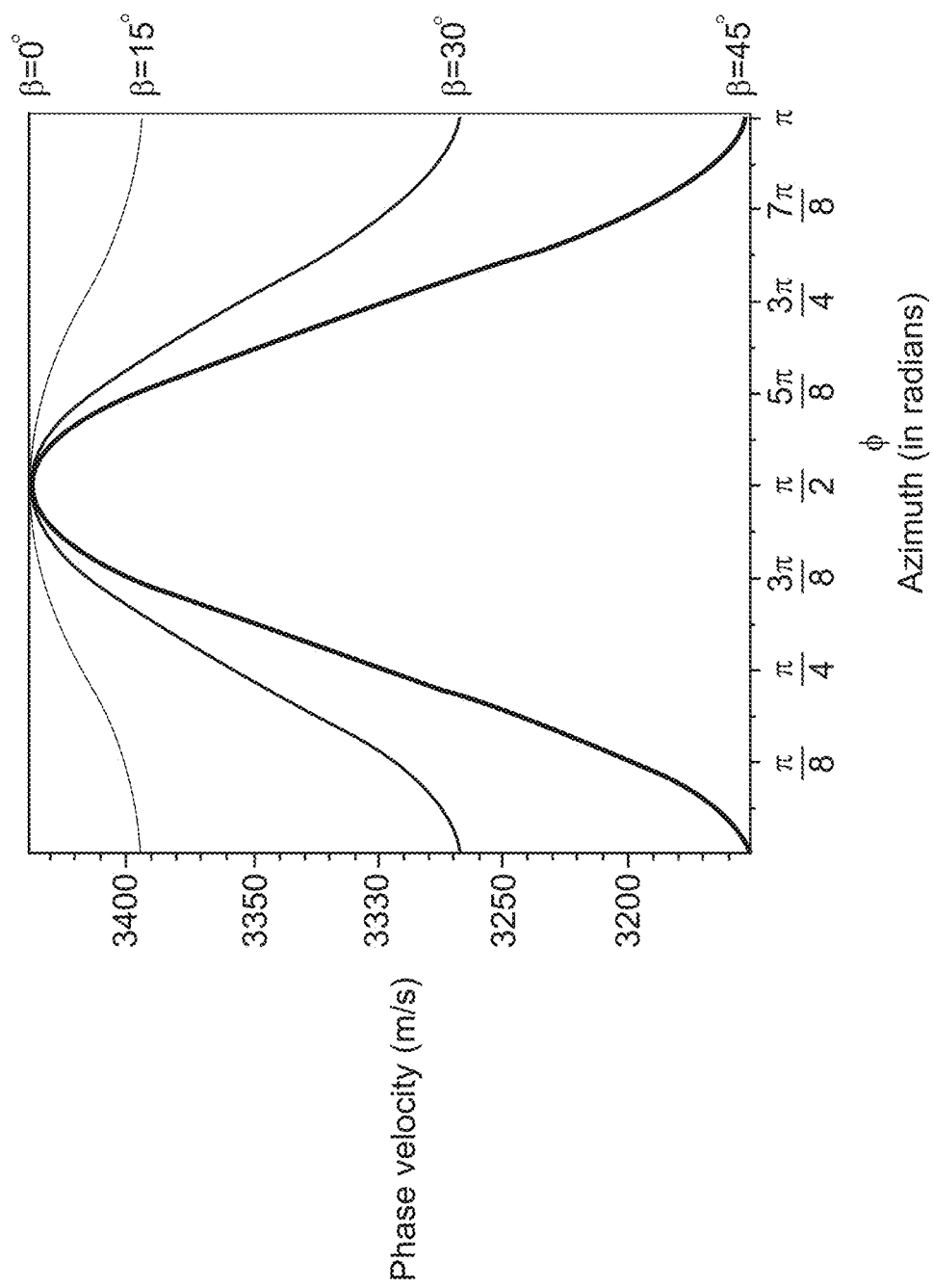
FIG. 10 is a graph illustrating phase velocity dependence to azimuth angle for different incidence angles measured from the vertical.

FIG. 10 is a graph illustrating the phase velocity as a function of azimuth angle for different incidence angles measured from the vertical. The azimuthal variations increase with incidence angles. The previously cited 1998 Rüger article provides a function linking the phase velocity to incidence angle and azimuth. Another form of the function may also be derived by rotating the stiffness matrix with rotation angles corresponding to the incidence angle and azimuth.

Phase and group angles are also different. The phase angle is the angle of the wave-front normal with reference to the symmetry axis, whereas the group or ray angle is the angle along which energy propagates. The article entitled, "Weak elastic anisotropy," by Thomsen, L. published in *Geophysics*, Vol. 51, No. 10 (October 1986), pp. 1954-1966, and the article entitled, "Reflection moveout and parameter estimation for horizontal transverse isotropy," by Tsvankin, I. published in *Geophysics*, Vol. 62, No. 2 (March-April 1997), pp. 614-629, provide illustration of the difference between phase and group angles in the case of transverse isotropy media with vertical axis (VTI) and with horizontal axis respectively. Thomsen's and Tsvankin's articles are incorporated herein by reference in their entirety.

The phase angle θ between the phase-velocity vector and the symmetry axis of the medium can be obtained from the group angle ψ (angle between the reflected group-velocity vector and the symmetry axis) using the derivative of the phase velocity Vp with regards to the phase angle θ according to the following formula (3) derived from Tsvankin 1997:

$$\tan(\psi - \theta) = \frac{dv_P/d\theta}{v_P}. \quad (3)$$

Figure 11:
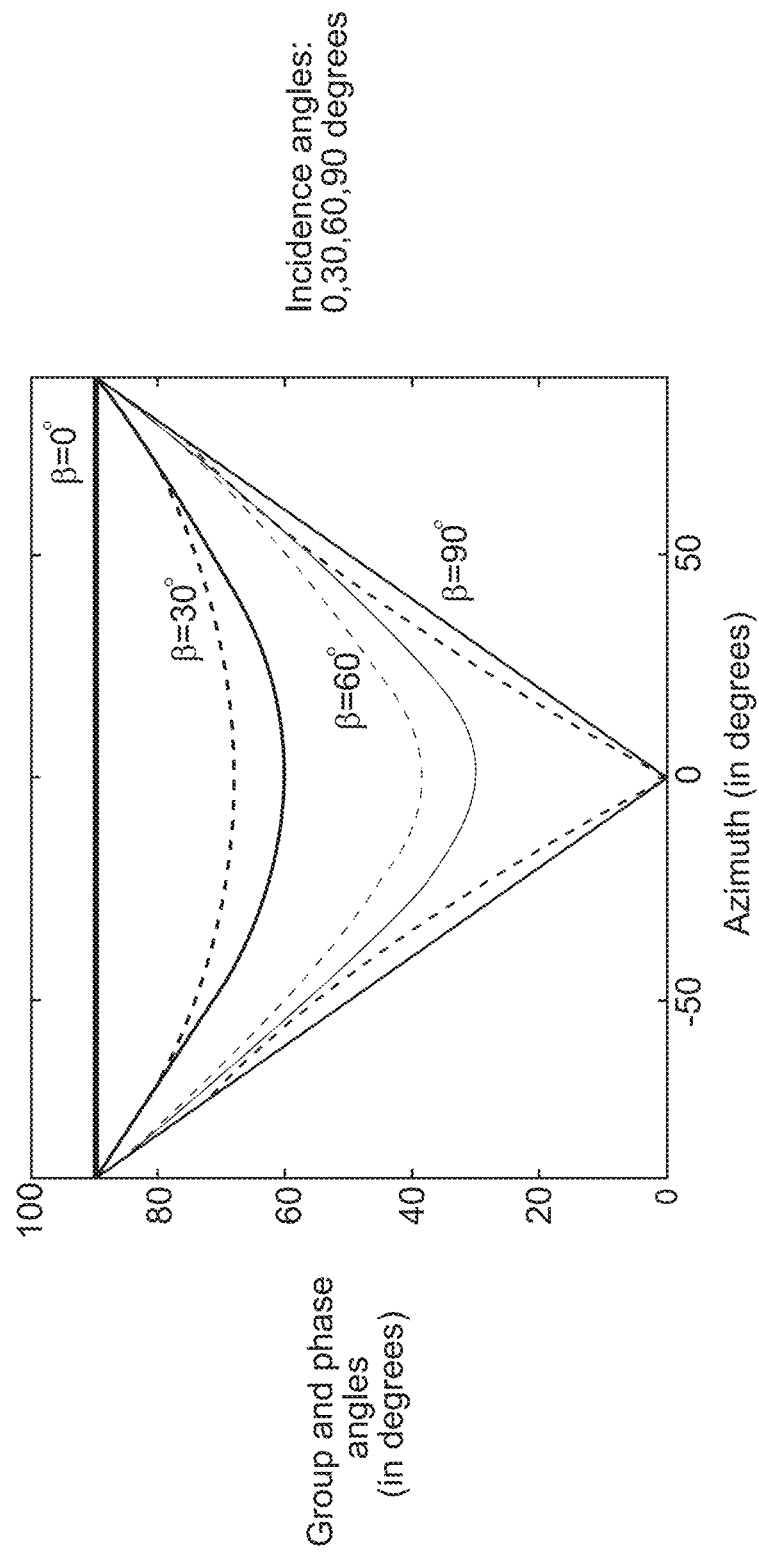
FIG. 11 is a graph illustrating group and phase angles variation with azimuth for different incidence angles measured from the vertical.

Formula (3) is a non-linear equation easily solved using a few iterations of Newton's method. FIG. 11 shows a comparison of group angles ψ (solid lines) converted to phase angles θ (dashed lines) in HTI media as a function of azimuth angle for different incidence angles β (0°, 30°, 60° and 90°) as labeled.

Then, the group velocity Vg may be obtained using the phase velocity Vp, the group and phase angles (ψ and θ respectively) using the following formula (4) derived from Thomsen 1986:

$$(Vg(\psi))^2 = (v_P(\theta))^2 + \left( \frac{\partial v_P}{\partial \theta} \right)^2 \quad (4)$$

Figure 12:
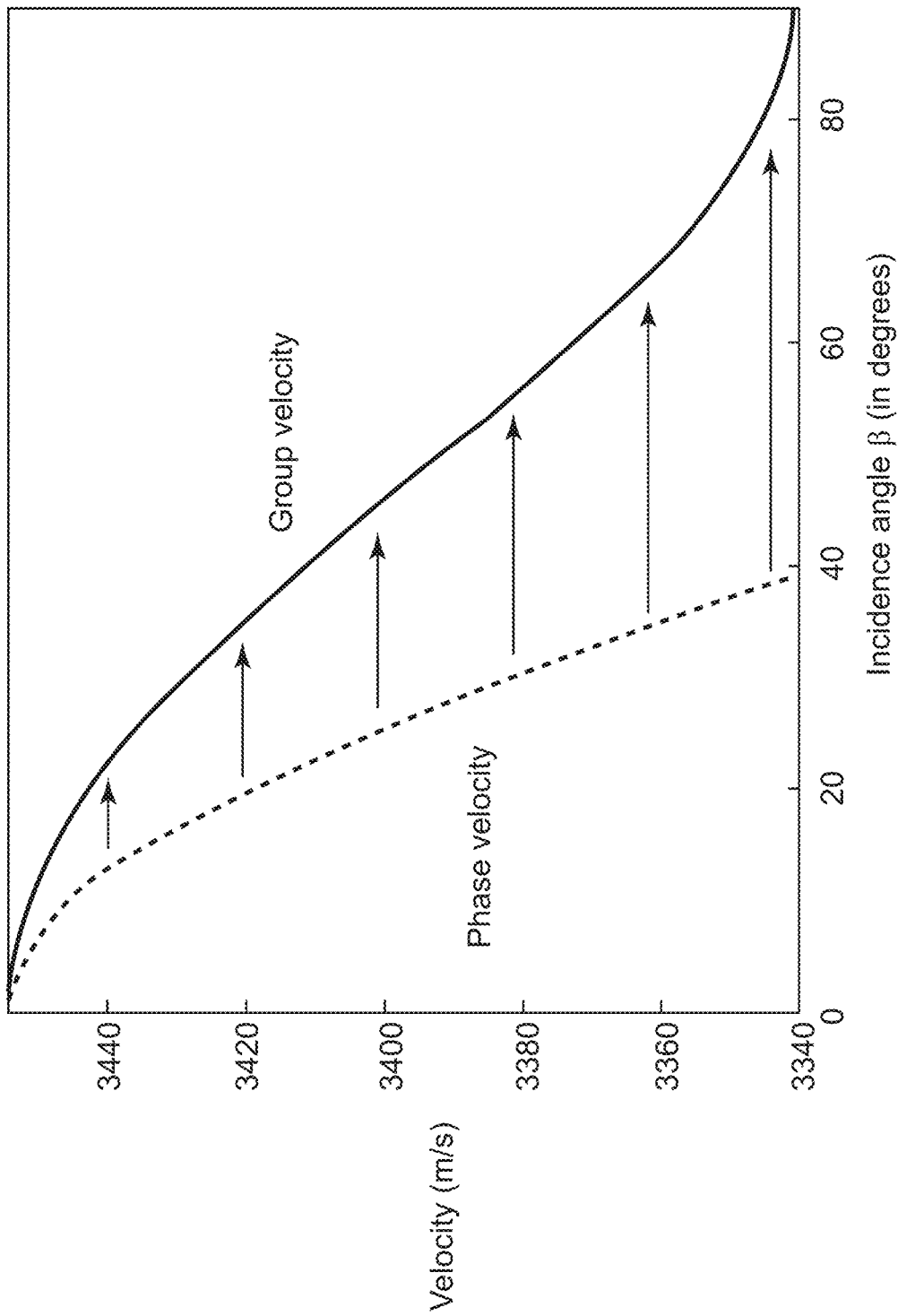
FIG. 12 is a graph illustrating the difference between phase velocity and group velocity in an HTI medium as a function of incidence angle measured from the vertical for a given azimuth.

FIG. 12 is a graph illustrating the difference between phase velocity and group velocity in an HTI medium. Group velocities are used to model azimuthal travel-times (i.e., pre-stack time-shifts), and phase velocities are used to model the azimuthal amplitudes. The AVAz part of the joint VVAz-AVAz inversion can be solved using existing methods in the azimuthal angle stack domain or more efficient AVAz techniques such as Fourier coefficients and statistical moments.

Similar to formula (1) and (2), the difference of travel-time as a function of incidence angle (i.e. group angle in the incidence plane β using 1997 Tsvankin's notation) and azimuth (i.e. the source-receiver azimuth φ) $\Delta TWT_{\beta,\phi}$ is given by formula (5) below, where $Vg_0$ is the reference group velocity, $Vg(\beta,\phi)$ is the direction-dependent group velocity and $\Delta TWT_0$ is the reference layer thickness in time (the middle volume element in FIG. 7). The stratigraphic grid therefore has a time axis per incidence angle and azimuth as illustrated in FIGS. 7-9.

$$\Delta TWT_{\beta,\phi} = \Delta TWT_0 \times \left( \frac{Vg_0}{Vg(\beta, \phi)} - 1 \right) \quad (5)$$

Joint VVAz and AVAz inversion enhances the results of both VVAz and AVAz simultaneously because each method benefits from the other. Several time axes are defined in the stratigraphic grid, their azimuthal and incidence angle variations being controlled by the group velocity derived from the phase velocity. This method is formulated for HTI anisotropy but can easily be extended to orthorhombic anisotropy.

Figure 13:
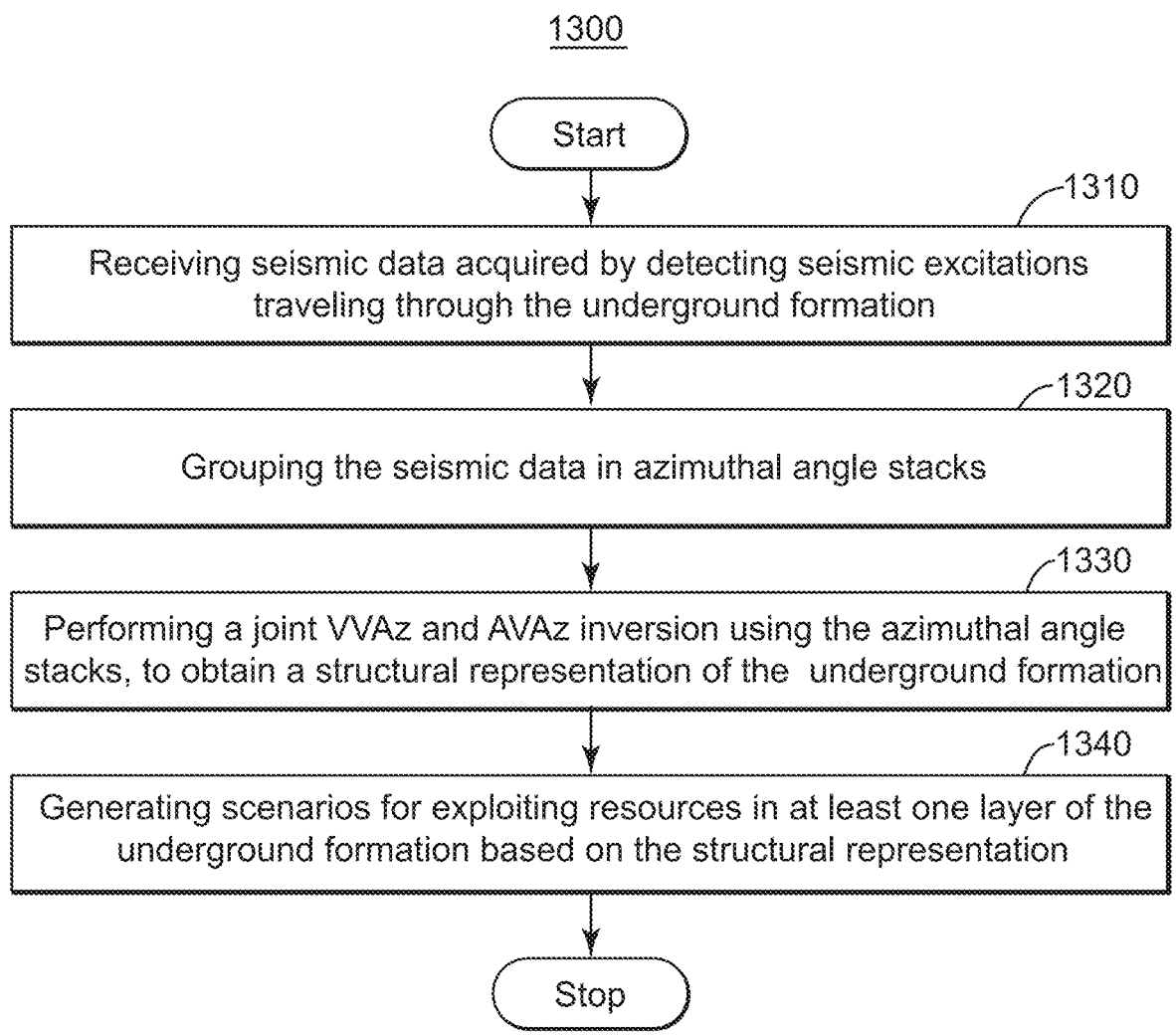
FIG. 13 is a flowchart of a method according to an embodiment.

FIG. 13 is a flowchart of method 1300 according to an embodiment. Method 1300 includes receiving seismic data acquired by detecting seismic excitations traveling through the underground formation at 1310, grouping the seismic data in azimuthal angle stacks at 1320, and performing a joint velocity-variation-with-azimuth, VVAz, and amplitude-variation-with-azimuth, AVAz, inversion using the azimuthal angle stacks to obtain a structural representation of the underground formation at 1330. Various aspects of steps 1310 and 1320 have been discussed above.

The method further includes generating scenarios for exploiting resources in at least one layer of the underground formation based on the structural representation at 1340. The outcomes of inversions are structural representation of the explored underground formation, which means, in other words, they map properties such as velocity, locating interfaces between different materials, fractures, porosity, etc. These types of information allow evaluation of the presence of hydrocarbons and various minerals and developing exploitation plans (e.g., a path to be followed when drilling to reach the oil or sought-after minerals, to pump liquids when extracting gas by hydraulic fracturing, etc.) called scenarios. The methods presented in this section increase consistency between seismic measurements and, thus, reliability of the structural representations.

The joint VVAz and AVAz inversion may be performed so as to yield anisotropy's properties consistent with both velocities and amplitudes. The joint VVAz and AVAz inversion may include determining a group velocity and a phase velocity for a layer. The phase velocity may be determined by rotating a stiffness matrix with the incidence angle and the azimuth angle or other methods. Group velocity may be determined using formula (3). Different time axes may be used for different azimuthal angle stacks. A difference in a two-way time-shift may be given by formula (5).

Figure 14:
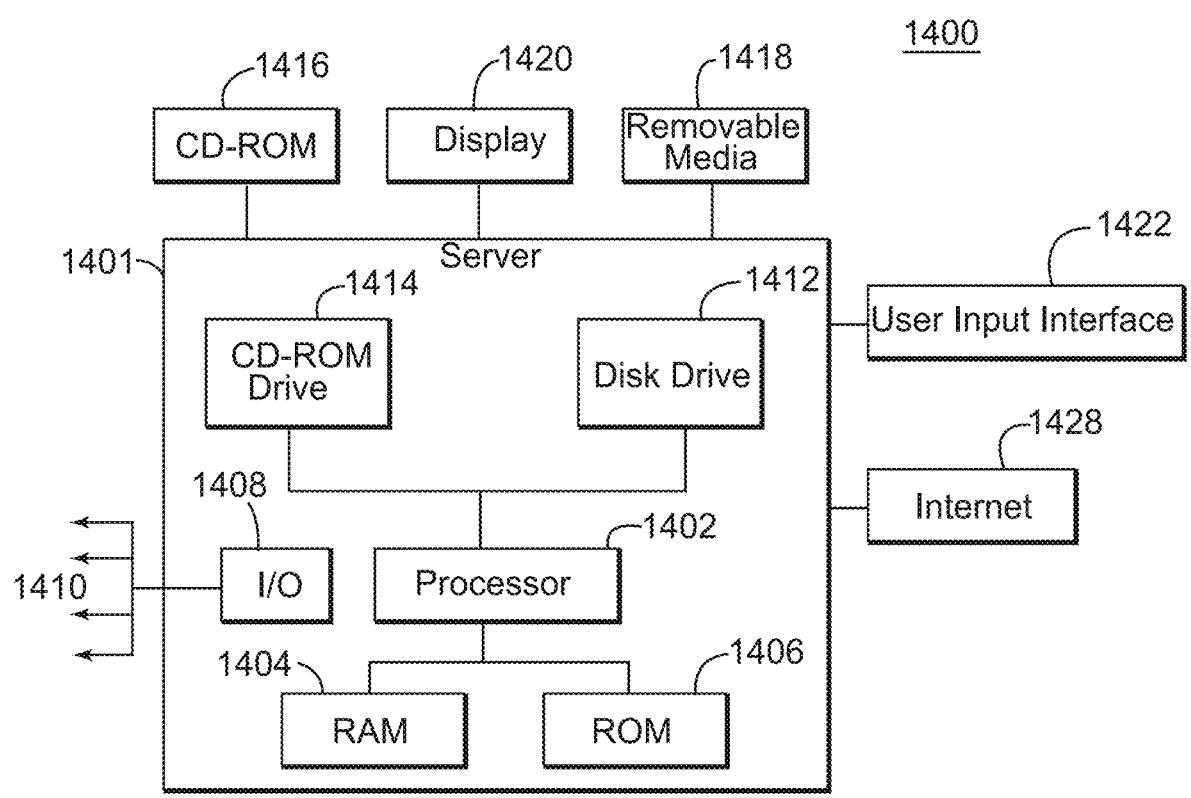
FIG. 14 is a schematic diagram of a seismic data processing apparatus according to an embodiment.

The above-discussed methods may be implemented in a computing device 1400 connected to or including seismic data storing equipment as illustrated in FIG. 14. Hardware, firmware, software or a combination thereof may be used to perform the various steps and operations described herein.

Exemplary computing device 1400 suitable for performing the activities described in the exemplary embodiments may include a server 1401. Server 1401 may include a central processor (CPU) 1402 coupled to a random-access memory (RAM) 1404 and to a read-only memory (ROM) 1406. ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions.

Server 1401 may also include one or more data storage devices, including hard drives 1412, CD-ROM drives 1414 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information such as seismic data. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as sources, detectors, etc. The server may be part of a larger network configuration as in a global area network (GAN) such as the internet 1428, which allows ultimate connection to various computing devices.

The disclosed exemplary embodiments provide methods for designing or adjusting a survey plan that achieves inline and cross-line seismic data irregularities suitable for compressive sensing reconstruction. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration of an underground formation including at least one anisotropic layer, the method comprising:
  receiving seismic data acquired by detecting seismic excitations traveling through the underground formation;
  grouping the seismic data in azimuthal angle stacks;
  performing a joint velocity-variation-with-azimuth, VVAz, and amplitude-variation-with-azimuth, AVAz, inversion using the azimuthal angle stacks to obtain a structural representation of the underground formation; and
  generating scenarios for exploiting resources in at least one layer of the underground formation based on the structural representation.

2. The method of claim 1, wherein the joint VVAz and AVAz inversion yields anisotropy properties consistent with both velocities and amplitudes.

3. The method of claim 1, wherein the performing of the joint VVAz and AVAz includes determining a group velocity and a phase velocity for a layer.

4. The method of claim 3, wherein the phase velocity is determined by rotating a stiffness matrix with the incidence angle and the azimuth angle.

5. The method of claim 3, wherein the group velocity, Vg, is obtained using the phase velocity according to:

$$(Vg(\psi))^2 = (v_P(\theta))^2 + \left(\frac{\partial v_P}{\partial \theta}\right)^2$$

where $\psi$ is a group angle, $\theta$ is a phase angle, and $v_p$ is the phase velocity.

6. The method of claim 1, wherein the performing of the joint VVAz and AVAz inversion uses different time axes for different azimuthal angle stacks.

7. The method of claim 6, wherein a difference in a two-way time-shift $\Delta TWT_{\beta,\phi}$ for an incidence angle, $\beta$, and an azimuth angle, $\phi$, is given by $$\Delta TWT_{\beta,\phi} = \Delta TWT_0 \times \left(\frac{Vg_0}{Vg(\beta,\phi)} - 1\right)$$

where $Vg_0$ is a reference group velocity, $Vg(\beta,\phi)$ is a direction-dependent group velocity and $\Delta TWT_0$ is a reference layer thickness expressed as a two-way time.

8. A system for seismic exploration of an underground formation including at least one anisotropic layer, the system comprising:
seismic data storing equipment configured store seismic data obtained by injecting seismic excitations into the underground formation, detecting the seismic excitations that travelled through the underground formation, and generating the seismic data based on the detected seismic excitations;
a seismic data processing unit configured
to group the seismic data in azimuthal angle stacks,
to perform a joint velocity-variation-with-azimuth, VVAz, and amplitude-variation-with-azimuth, AVAz, inversion using the azimuthal angle stacks to obtain a structural representation of the underground formation, and
to generate scenarios related to exploiting resources in at least one layer of the underground formation using the structural representation.

9. The system of claim 8, wherein the joint VVAz and AVAz inversion yields anisotropy's properties consistent with both velocities and amplitudes.

10. The system of claim 8, wherein the data processing unit includes determining a group velocity and a phase velocity for a layer in the joint VVAz and AVAz inversion.

11. The system of claim 10, wherein the data processing unit determines the phase velocity by rotating a stiffness matrix with the incidence angle and the azimuth angle.

12. The system of claim 11, wherein the data processing unit uses the phase velocity to obtain the group velocity, Vg, according to:

$$(Vg(\psi))^2 = (v_P(\theta))^2 + \left(\frac{\partial v_P}{\partial \theta}\right)^2$$

where $\psi$ is a group angle, $\theta$ is a phase angle, and $v_p$ is the phase velocity.

13. The system of claim 8, wherein the data processing unit uses different time axes for different azimuthal angle stacks when performing of the joint VVAz and AVAz inversion.

14. The system of claim 13, wherein a difference in a two-way time-shift $\Delta TWT_{\beta,\phi}$ for an incidence angle, $\beta$, and an azimuth angle, $\phi$, is given by $$\Delta TWT_{\beta,\phi} = \Delta TWT_0 \times \left(\frac{Vg_0}{Vg(\beta,\phi)} - 1\right)$$

where $Vg_0$ is a reference group velocity, $Vg(\beta,\phi)$ is a direction-dependent group velocity and $\Delta TWT_0$ is a reference layer thickness expressed as two-way time.

15. A computer readable medium storing executable codes which, when executed by a processor, make the processor perform a method of seismic exploration of an underground formation including at least one anisotropic layer, the method comprising:
receiving seismic data acquired by detecting seismic excitations traveling through the underground formation;
grouping the seismic data in azimuthal angle stacks;
performing a joint velocity-variation-with-azimuth, VVAz, and amplitude-variation-with-azimuth, AVAz, inversion using the azimuthal angle stacks to obtain a structural representation of the underground formation; and
generating scenarios for exploiting resources in at least one layer of the underground formation based on the structural representation.

16. The computer readable medium of claim 15, wherein the joint VVAz and AVAz inversion yields anisotropy properties consistent with both velocities and amplitudes.

17. The computer readable medium of claim 15, wherein the performing of the joint VVAz and AVAz includes determining a group velocity and a phase velocity for a layer.

18. The computer readable medium of claim 17, wherein the group velocity, Vg, is obtained using the phase velocity according to:

$$(Vg(\psi))^2 = (v_P(\theta))^2 + \left(\frac{\partial v_P}{\partial \theta}\right)^2$$

where $\psi$ is a group angle, $\theta$ is a phase angle, and $v_p$ is the phase velocity.

19. The computer readable medium of claim 15, wherein the performing of the joint VVAz and AVAz inversion uses different time axes for different azimuthal angle stacks.

20. The computer readable medium of claim 19, wherein a difference in a two-way time-shift $\Delta TWT_{\beta,\phi}$ for an incidence angle, $\beta$, and an azimuth angle, $\phi$, is given by $$\Delta TWT_{\beta,\phi} = \Delta TWT_0 \times \left(\frac{Vg_0}{Vg(\beta,\phi)} - 1\right)$$

where $Vg_0$ is a reference group velocity, $Vg(\beta,\phi)$ is a direction-dependent group velocity and $\Delta TWT_0$ is a reference layer thickness expressed as a two-way time.

* * * * *